(12) United States Patent
Shigeta et al.

(10) Patent No.: US 7,048,084 B2
(45) Date of Patent: May 23, 2006

(54) POWER DISTRIBUTION CONTROL APPARATUS OF FOUR-WHEEL DRIVE VEHICLE

(75) Inventors: Ryouhei Shigeta, Anjo (JP); Tsuyoshi Murakami, Handa (JP); Hisao Fumoto, Hiroshima (JP); Yutaka Hirokane, Hiroshima (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 95 days.

(21) Appl. No.: 10/885,611

(22) Filed: Jul. 8, 2004

(65) Prior Publication Data

US 2005/0029035 A1  Feb. 10, 2005

(30) Foreign Application Priority Data

Jul. 8, 2003  (JP) ............................. 2003-193641

(51) Int. Cl.
  *B60K 17/35* (2006.01)
(52) U.S. Cl. .................... 180/248; 180/247; 701/69
(58) Field of Classification Search ............... 180/245, 180/246, 248–250; 701/69, 87–90
  See application file for complete search history.

(56) References Cited

U.S. PATENT DOCUMENTS 4,766,973 A    8/1988  Kashihara et al.
5,105,901 A    4/1992  Watanabe et al.
5,752,211 A *  5/1998  Takasaki et al. ............. 701/69
5,826,209 A * 10/1998  Matsuno ....................... 701/69
6,845,838 B1 * 1/2005  Wakao et al. ................ 180/248
6,873,896 B1 * 3/2005  Maekawa et al. ............. 701/69

FOREIGN PATENT DOCUMENTS

EP    0 314 389 A2    5/1989
JP    10-272955       10/1998

* cited by examiner

*Primary Examiner*—Lesley D. Morris
*Assistant Examiner*—L. Lum
(74) *Attorney, Agent, or Firm*—Oblon, Spivak, McClelland, Maier & Neustadt, P.C.

(57) ABSTRACT

A CPU computes a throttle opening degree increasing speed $V\theta h$ and a steering wheel angular velocity $V\theta$ based on a throttle opening degree $\theta h$ and a steering wheel angle $\theta$. Based on the throttle increasing speed $V\theta h$ and the steering wheel angular velocity $V\theta$, the CPU selects one of a first drive mode and a second drive mode. The CPU controls the power transmission ratio of a power transmitting device according to the selected drive mode. Therefore, the power transmission ratio of the power transmitting device is properly controlled in accordance with the degree of intention for acceleration of the driver, which is computed based on the throttle increasing speed $V\theta h$, and the turning speed of the steering wheel, which is computed based on the steering wheel angular velocity $V\theta$. Therefore, the drive mode is properly switched in accordance with the driving state of a four-wheel drive vehicle.

13 Claims, 4 Drawing Sheets

First Threshold Value Map M1

Fig.4

Second Threshold Value Map M2

Fig.5

Drive mode transition process

POWER DISTRIBUTION CONTROL APPARATUS OF FOUR-WHEEL DRIVE VEHICLE

BACKGROUND OF THE INVENTION

The present invention relates to a power distribution control apparatus for a four-wheel drive vehicle.

Four-wheel drive vehicle systems include full time drive systems, part-time drive systems, and on-demand drive systems (torque split drive systems). A full-time drive system constantly drives four wheels. A part-time drive system switches between four-wheel drive and two-wheel drive as needed. An on-demand drive system performs a seamless transition between four-wheel drive and two-wheel drive as needed. A four-wheel drive vehicle equipped with a full time drive system has a center differential between the front wheels and the rear wheels. Since the center differential permits the front wheels and the rear wheels to rotate at different rotation speeds, full-time four-wheel drive is possible.

Part-Time Drive System

As a four-wheel drive vehicle equipped with a part-time drive system, a vehicle in which the drive mode is switched from two-wheel drive to four-wheel drive is known. In such a four-wheel drive vehicle, computations are performed in which the lateral acceleration, the steering speed, the throttle opening degree, and the speed of increase of the throttle opening degree are each multiplied by a predetermined coefficient. Based on the computation results, the degree of sporty driving behavior on the part of the driver is computed. In other words, how briskly the driver manipulates the vehicle is detected. Then, based on the computed degree of sporty driving, the drive mode is switched between the two-wheel drive and the four-wheel drive (for example, refer to Japanese Laid-Open Patent Publication No. 10-272955).

On-Demand Drive System

A four-wheel drive vehicle equipped with an on-demand drive system includes main drive wheels that are directly coupled to the engine and auxiliary drive wheels (follower wheels) that are coupled to the engine with a power transmitting device. According to the road condition and the driving state, the coupling force (engaging force) of the power transmitting device is varied to optimize the power distribution to the auxiliary drive wheels. The power transmitting device has an electromagnetic clutch mechanism. By controlling the current to the electromagnetic coil incorporated in the electromagnetic clutch mechanism, the clutch discs are engaged with one another so that the housing and the rotary shaft are coupled to each other. Accordingly, the power generated by the engine is transmitted to the auxiliary drive wheels. Specifically, a wheel speed sensor is provided in each drive wheel. Based on detection results of the wheel speed sensors, the difference between the average speed of the main drive wheels and the average speed of the auxiliary drive wheels is obtained. The current to the electromagnetic coil is controlled based on the difference of the average speeds. Accordingly, the vehicle is driven in the four-wheel drive mode. For example, when the main drive wheels or the auxiliary drive wheels skid, the power transmitting device is electronically controlled to perform the four-wheel drive.

That is, in the four-wheel drive vehicle of the on-demand system, the power transmitting device controls the engaging force of the clutch discs. Accordingly, one of a first drive mode and a second drive mode is selected and the power distribution ratio to the front wheels and the rear wheels are controlled. In the same driving state, the power distribution to the front wheels and the rear wheels is closer to the equalized state in the second drive mode than in the first drive mode.

The four-wheel drive vehicle of the part-time type disclosed in the above publication only has two drive modes, that is, the two-wheel drive and the four-wheel drive. Therefore, the ratio of the power distribution cannot be properly controlled in accordance with the driving state.

In the case of a four-wheel drive vehicle of the on-demand system, if, for example, the driver prefers sporty driving, the drive mode is switched from the first drive mode to the second drive mode to enhance the performance of the vehicle. Therefore, the driving behavior of the driver is determined based on various parameters such as the vehicle speed, the angle of the steering wheel, and the angular velocity of the steering wheel. Based on the result of the determination, the drive mode is switched to the second drive mode. However, the driving behavior of the driver cannot be accurately detected with these parameters in some cases. Thus, the drive mode sometimes cannot be appropriately switched from the two-wheel drive to the four-wheel drive in some cases. Therefore, the ratio of the power distribution may fail to be properly controlled in accordance with the driving state.

SUMMARY OF THE INVENTION

Accordingly, it is an objective of the present invention to provide a power distribution control apparatus for a four-wheel drive vehicle that is capable of appropriately controlling the ratio of power distribution in accordance with the driving condition.

To achieve the foregoing and other objectives and in accordance with the purpose of the present invention, a power distribution control apparatus of a four-wheel drive vehicle equipped with a power source is provided. The vehicle has front wheels and rear wheels, and a transmitting device. The front wheels and the rear wheels are driven by the power source. The transmitting device is capable of changing distribution of power to the front wheels and the rear wheels. The control apparatus selects one of at least a first drive mode and a second drive mode according to a driving state of the vehicle. The control apparatus controls the transmitting device such that the power distribution to the front wheels and the rear wheels is a ratio that corresponds to the selected drive mode. The power distribution to the front wheels and the rear wheels is closer to the equalized state in the second drive mode than in the first drive mode. The control includes storing means and determining means. The storing means in advance stores a threshold value map used for setting a threshold value related to an angular velocity of a steering wheel of the vehicle. The threshold value map is a three-dimensional map that uses a vehicle speed and an angle of the steering wheel as parameters. Based on the threshold value map, the determining means sets the threshold value according to the current vehicle speed and the steering wheel angle. When the current steering wheel angular velocity is not greater than the set threshold value, the determining means selects the first drive mode. When the current steering wheel angular velocity is greater than the set threshold value, the determining means selects the second drive mode. The threshold value map is configured such that the threshold value is decreased as the vehicle speed is increased and that threshold value is greater in a predetermined small steering wheel angle region than in a steering wheel angle region that corresponds to greater values of the steering wheel angle than the small steering wheel angle region.

The present invention also provides method for controlling a power distribution control apparatus of a four-wheel drive vehicle equipped with a power source. The vehicle has front wheels and rear wheels, and a transmitting device. The front wheels and the rear wheels are driven by the power source. The transmitting device is capable of changing distribution of power to the front wheels and the rear wheels. The method comprising: controlling the transmitting device such that the power distribution to the front wheels and the rear wheels is a ratio that corresponds to a drive mode that is selected from a first drive mode and a second drive mode, wherein the power distribution to the front wheels and the rear wheels is closer to the equalized state in the second drive mode than in the first drive mode; storing in advance in a memory a threshold value map used for setting a threshold value related to an angular velocity of a steering wheel of the vehicle, wherein the threshold value map is a three-dimensional map that uses a vehicle speed and an angle of the steering wheel as parameters; setting the threshold value according to the current vehicle speed and the steering wheel angle based on the threshold value map; and selecting the first drive mode when the current steering wheel angular velocity is not greater than the set threshold value, and selecting the second drive mode when the current steering wheel angular velocity is greater than the set threshold value. The threshold value map is configured such that the threshold value is decreased as the vehicle speed is increased and that threshold value is greater in a predetermined small steering wheel angle region than in a steering wheel angle region that corresponds to greater values of the steering wheel angle than the small steering wheel angle region.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A four-wheel drive vehicle 1 according to one embodiment of the present invention will now be described with reference to FIGS. 1 to 5. The front wheels are always driven when the vehicle 1 is driving.

General Configuration of Four-Wheel Drive Vehicle

Figure 1:
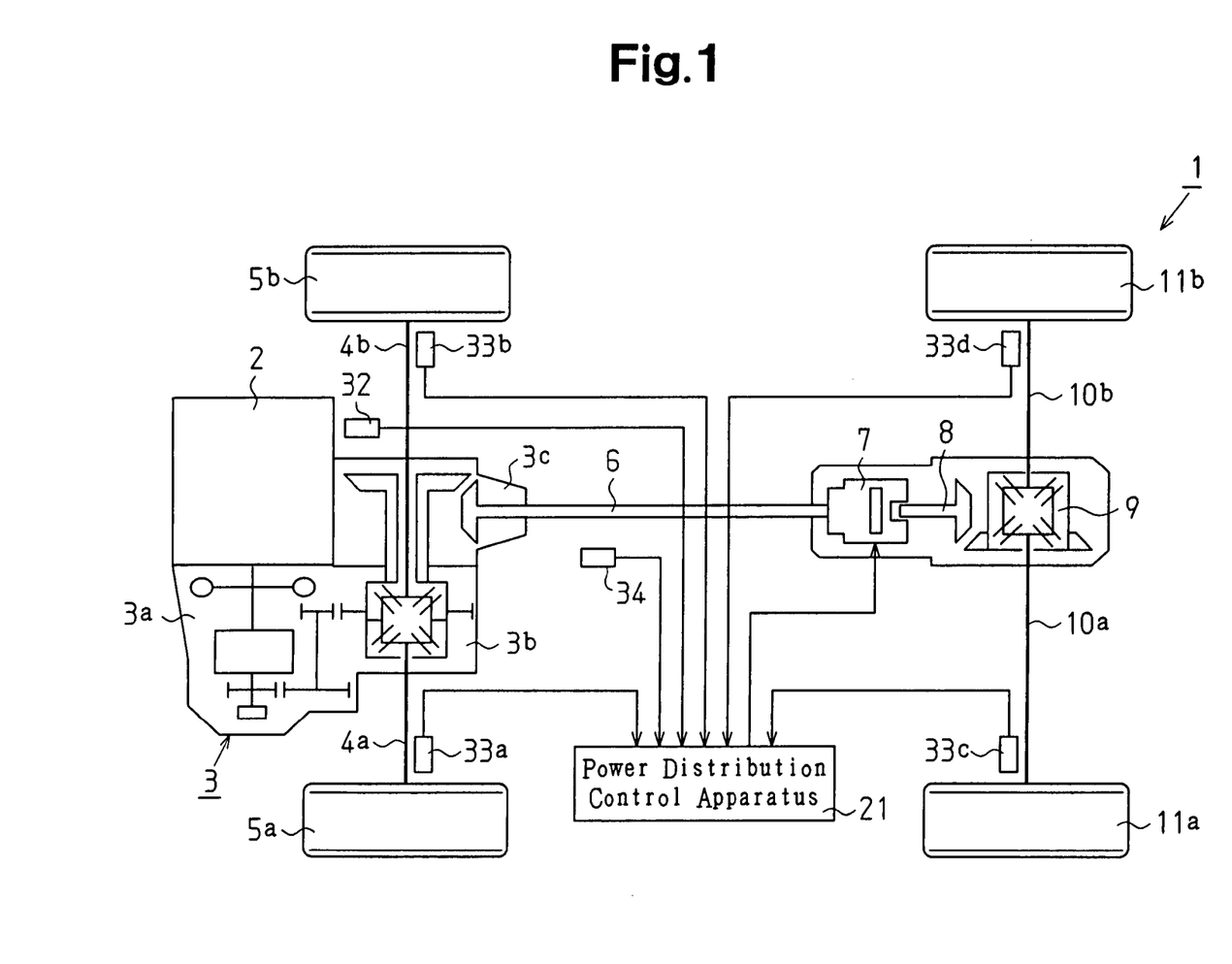
FIG. 1 is a schematic diagram illustrating a four-wheel drive vehicle according to a preferred embodiment of the present invention.

As shown in FIG. 1, the four-wheel drive vehicle 1 has an engine 2 and a transaxle 3. The transaxle 3 includes a transmission 3a, a front differential 3b, and a transfer 3c. Front axles 4a, 4b are coupled to the front differential 3b. Left and right front wheels 5a, 5b are coupled to the front axles 4a, 4b, respectively. The power of the engine 2 is transmitted to the left and right front wheels 5a, 5b through the transmission 3a, the front differential 3b, and the front axles 4a, 4b.

A propeller shaft 6 is coupled to the transfer 3c. The propeller shaft 6 is coupled to a power transmitting device 7. A rear differential 9 is connected to the power transmitting device 7 via a drive pinion shaft 8. The rear differential 9 is coupled with left and right rear wheels 11a, 11b by a pair of rear axles 10a, 10b.

When the propeller shaft 6 is connected to the drive pinion shaft 8 with the power transmitting device 7 to transmit torque, the power of the engine 2 is transmitted to the left and right rear wheels 11a, 11b by the transmission 3a, the transfer 3c, the propeller shaft 6, the drive pinion shaft 8, the rear differential 9, and the rear axles 10a, 10b.

Power Transmitting Device

The power transmitting device 7 includes an electromagnetic clutch mechanism of a multi-disc wet type. The electromagnetic clutch mechanism includes an electromagnetic coil 7a (see FIG. 2) and several clutch discs. The clutch discs are selectively engaged. A power distribution control apparatus 21, which will be discussed below, supplies a current to the electromagnetic coil 7a based on a control signal (command value). In accordance with the value of the supplied current, the electromagnetic coil 7a engages the clutch discs to transmit power from the propeller shaft 6 to the drive pinion shaft 8.

Specifically, the power of the engine 2 transmitted from the propeller shaft 6 to the drive pinion shaft 8 (the left and right rear wheels 11a, 11b) is determined by the frictional force of the clutch discs. The transmitted power is increased as the frictional force is increased. The frictional force is, in turn, determined according to the current value supplied to the electromagnetic coil 7a. That is, the amount of current supplied to the electromagnetic coil 7a is controlled to adjust the torque transmitted between the front wheels 5a, 5b and the rear wheels 11a, 11b. In other words, the locking force between the front wheels 5a, 5b and the rear wheels 11a, 11b is arbitrarily adjusted. Whether current needs to be supplied to or stopped to the electromagnetic coil 7a and the amount of the supplied current are controlled by a power distribution control apparatus 21, which will be described later.

Electric Configuration of Power Transmission Control Circuit

Figure 2:
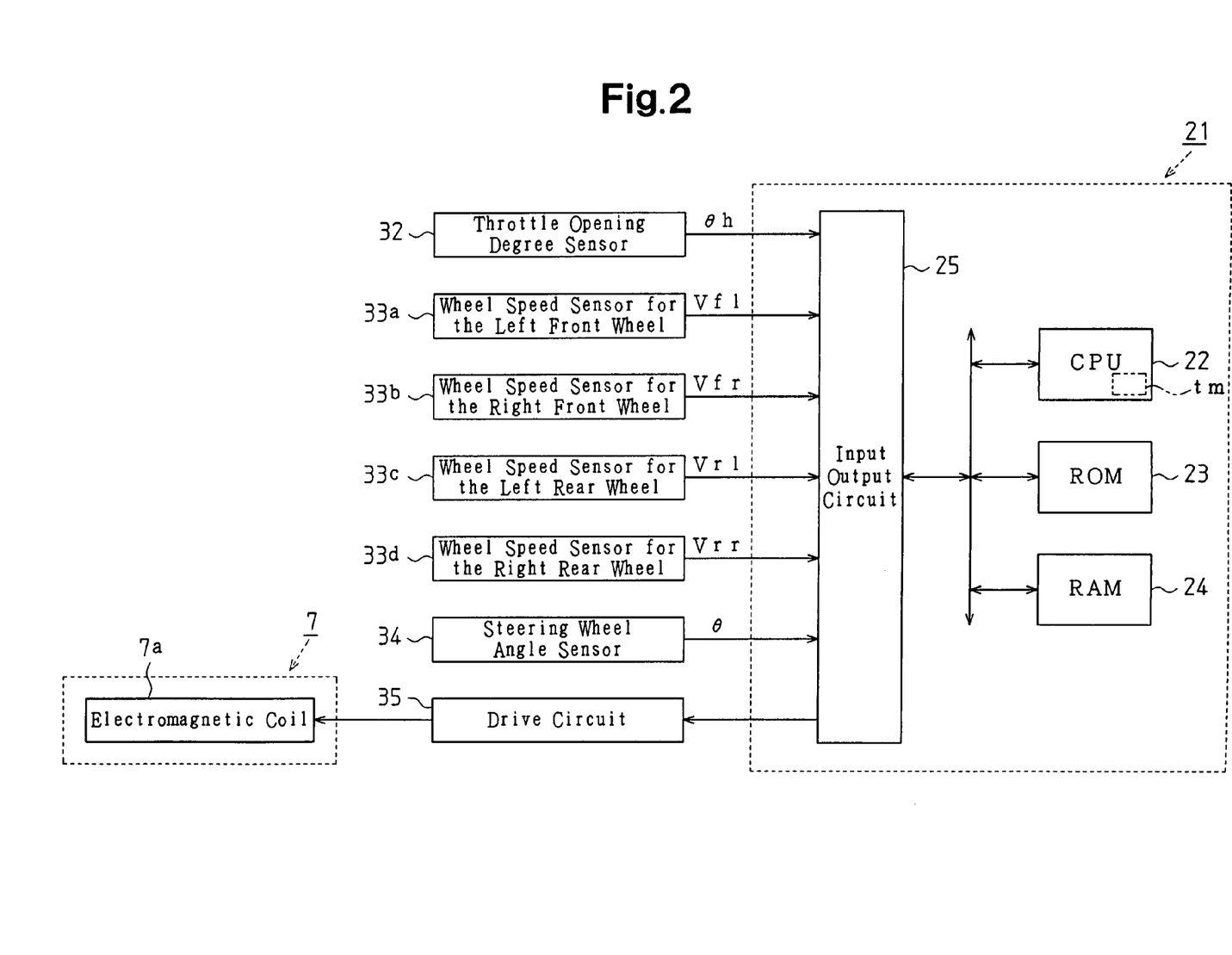
FIG. 2 is a circuit diagram showing the electric configuration of a power distribution control apparatus mounted to the four-wheel drive vehicle shown in FIG. 1.

The electric configuration of a power distribution control apparatus 21 for controlling the power transmitting device 7 will now be described. As shown in FIG. 2, the power distribution control apparatus 21 includes a central processing unit (CPU) 22, a read only memory (ROM) 23, a random access memory (RAM) 24, and input-output circuit 25.

ROM 23

The ROM 23 stores several types of control programs executed by the CPU 22 and several types of data and characteristic maps. The maps are obtained based on, for example, experimental data of a vehicular model and conventional theoretical calculations. The RAM 24 is a working area in which the CPU 22 unarchives the control programs stored in the ROM 23 to perform several computations (for example, computations for controlling current to the electromagnetic coil 7a). The RAM 24 also temporarily stores the computation results.

Programs

The programs stored in the ROM 23 include a basic control program and a drive mode selecting program. The drive modes of the power transmitting device 7 include a first drive mode (normal drive mode) and a second drive mode (sport drive mode). In the first and second drive modes, the power distribution to the front and rear wheels are varied. Under the same driving state, the power distribution to the front wheels and the rear wheels is closer to the equalized state in the second drive mode than in the first drive mode. The basic control program is executed for computing the value of a current supplied to the electromagnetic coil 7a that corresponds to the current driving state, and for controlling the current to the coil 7a with the computed value. On the other hand, the drive mode selecting program is executed for switching the drive mode between the first drive mode and the second drive mode based on the comparison between detected values of the sensors and a drive mode threshold values corresponding to each of the sensors at a predetermined control cycle. The parameters representing the driving state include a vehicle speed V, a steering wheel angle $\theta$, a steering wheel angular velocity V$\theta$, a throttle opening degree $\theta$h, and a speed of increase of the throttle opening degree (throttle increasing speed V$\theta$h).

Data of Various Maps

The data of various maps stored in the ROM 23 include torque characteristics map data for the first drive mode and torque characteristics map data for the second drive mode. The maps of the torque characteristics are obtained based on, for example, experimental data of a vehicular model and conventional theoretical calculations. The torque characteristics maps are used for optimizing the power distribution ratio for the current driving state and for obtaining the transmission torque, that is, a target engaging force (command value) according to detected values of the sensors. The CPU 22 computes the duty ratio of the current supplied to the electromagnetic coil 7a based on the transmission torque obtained based on the detected values from the sensors.

The torque characteristics map of the first drive mode and the torque characteristics map of the second four-wheel drive are set such that the transmission torque, or the engaging force of the electromagnetic clutch mechanism, in the second drive mode is greater than the transmission torque in the first drive mode. Therefore, when the power transmitting device 7 is controlled in the second drive mode, the ratio of power transmitted to the rear wheels 11a, 11b is increased compared to a case where the power transmitting device 7 is controlled in the first drive mode. That is, the power distribution to the front wheels 5a, 5b and the power distribution to the rear wheels 11a, 11b approach each other.

Maps M1, M2 of First and Second Threshold Values

Figure 3:
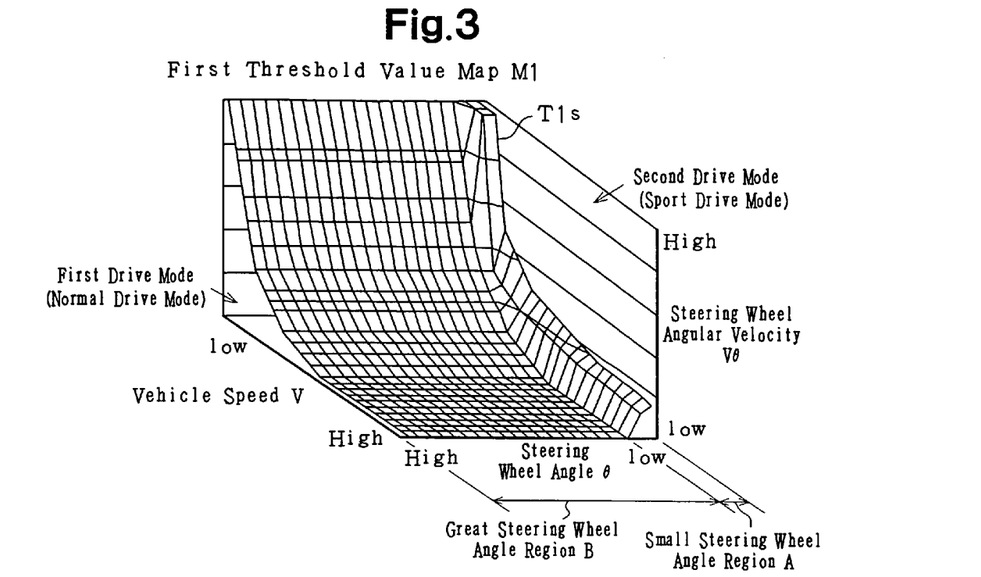
FIG. 3 is a map of a first threshold value used in the preferred embodiment.
Figure 4:
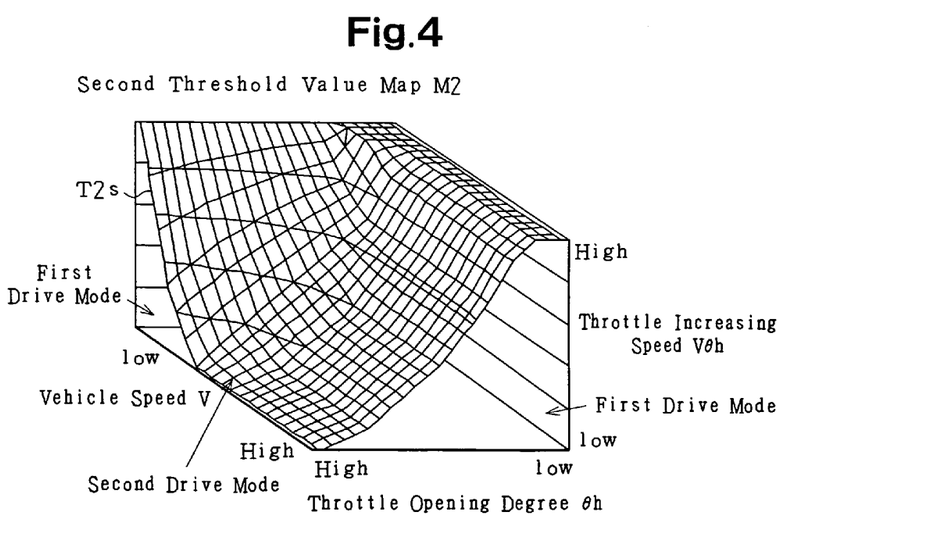
FIG. 4 is a map of a second threshold value used in the preferred embodiment.

The maps stored in the ROM 23 include a first threshold value map M1 and a second threshold value map M2 shown in FIGS. 3 and 4.

First Threshold Value Map M1

The first threshold value map M1 shown in FIG. 3 is a three dimensional map of the steering wheel angular velocity V$\theta$, or a first threshold value T1s (threshold value of the steering wheel angular velocity), in which the vehicle speed V and the steering wheel angle $\theta$ are used as parameters. In the first threshold value map M1, the first threshold value T1s is decreased as the vehicle speed V is increased. This is because the probability that the driving stability is impaired is low when the vehicle speed V is low, and the probability that the driving stability is impaired is increased as the vehicle speed V is increased.

The characteristics of the first threshold value map M1 are determined such that the first threshold value T1s in a small steering wheel angle region A including the minimum steering wheel angle $\theta$ is greater than the first threshold value T1s in a great steering wheel angle region B in which the steering wheel angle is greater than in the small steering wheel angle $\theta$ region A.

The CPU 22 compares the first threshold value T1s that is set according to the first threshold value map M1 in advance with a first object value T1, which represents the current steering wheel angular velocity V$\theta$. Based on the result of the comparison, the CPU 22 determines whether the drive mode of the four-wheel drive vehicle 1 should be switched to the first drive mode or the second drive mode.

For a smaller value of the first threshold value T1s, the first drive mode is less likely to be selected. For a greater value of the first threshold value T1s, the first drive mode is more likely to be selected. In other words, for a smaller value of the first threshold value T1s, the second drive mode is more likely to be selected. For a greater value of the first threshold value T1s, the second drive mode is less likely to be selected.

Therefore, when the steering angle $\theta$ is greater than the predetermined small steering angle region A, the second drive mode is more likely to be selected irrespective of the steering wheel angular velocity V$\theta$ as the vehicle speed V is increases. When the vehicle speed V is low, the second drive mode is more likely to be selected irrespective of the steering wheel angle $\theta$ as the steering wheel angular velocity V$\theta$ is increases.

Second Threshold Value Map M2

The second threshold value map M2 shown in FIG. 4 is a three dimensional map of the throttle increasing speed V$\theta$h, or a second threshold value T2s, in which the vehicle speed V and the throttle opening degree $\theta$h are used as parameters. In the second threshold value map M2, the second threshold value T2s is decreased as the vehicle speed V is increased. This is because the probability that the driving stability is impaired is low when the vehicle speed V is low, and the probability that the driving stability is impaired is increased as the vehicle speed V is increased. In addition, the second threshold value map M2 is configured such that the second threshold value T2s is decreased as the throttle opening degree $\theta$h is increased.

The CPU 22 compares the second threshold value T2s that is set according to the second threshold value map M2 in advance with a second object value T2, which represents the current throttle increasing speed V$\theta$h. Based on the result of the comparison, the CPU 22 determines whether the drive mode of the four-wheel drive vehicle 1 should be switched to the first drive mode or the second drive mode.

For a smaller value of the second threshold value T2s, the first drive mode is less likely to be selected. For a greater value of the second threshold value T2s, the first drive mode is more likely to be selected. In other words, for a smaller value of the second threshold value T2s, the second drive mode is more likely to be selected. For a greater value of the second threshold value T2s, the second drive mode is less likely to be selected.

Therefore, as the vehicle speed V and the throttle opening degree $\theta$h are each increased, the second drive mode is more likely to be selected irrespective of the throttle increasing speed Vθh. On the other hand, for smaller values of the vehicle speed V and the throttle opening degree θh, the second drive mode is only selected when the throttle increasing speed Vθh is great.

CPU

The CPU 22 controls the power transmitting device 7 according to the various programs stored in the ROM 23. That is, the CPU 22 executes various computations for controlling current supplied to the electromagnetic coil 7a. The CPU 22 is connected via the input-output circuit 25 to a throttle opening degree sensor 32, a wheel speed sensor 33a for the left front wheel, a wheel speed sensor 33b for the right front wheel, a wheel speed sensor 33c for the left rear wheel, a wheel speed sensor 33d for the right rear wheel, a steering wheel angle sensor 34, and a drive circuit 35. The drive circuit 35 is connected to the electromagnetic coil 7a of the power transmitting device 7.

Throttle Opening Degree Sensor

The throttle opening degree sensor 32 is connected to a throttle valve (not shown) of the engine 2. The throttle opening degree sensor 32 detects the opening degree of the throttle valve (throttle opening degree θh), or the depression amount of an acceleration pedal (not shown) when a driver depresses the pedal. The throttle opening degree sensor 32 sends a signal related to the detected depression degree to the power distribution control apparatus 21.

Wheel Speed Sensors

The four wheel speed sensors 33a, 33b, 33c, 33d are provided for the left and right front wheels 5a, 5b and the left and right rear wheels 11a, 11b. The four wheel speed sensors 33a, 33b, 33c, 33d separately detect the wheel speed (the number of rotation per unit time, that is, the rotation speed) of the front wheels 5a, 5b and the rear wheels 11a, 11b, and send a corresponding wheel speed signal to the power distribution control apparatus 21.

Steering Wheel Angle Sensor

The steering wheel angle sensor 34 is provided on a steering shaft (not shown). The steering wheel angle sensor 34 detects the rotation angle of the steering wheel (that is, the steering wheel angle). The steering wheel angle sensor 34 sends a signal related to the detected steering wheel angle to the power distribution control apparatus 21.

Functions of CPU

Then, based on various information (detected signals) from the throttle opening degree sensor 32, the wheel speed sensors 33a, 33b, 33c, 33d, and the steering wheel angle sensor 34, the CPU 22 executes various control programs such as a program for controlling the power distribution, and computes the amount of the current (command current value) supplied to the electromagnetic coil 7a. The CPU 22 sends to the drive circuit 35 a duty ratio control signal for supplying the computed current command value to the electromagnetic coil 7a. The drive circuit 35 is actuated based on the duty ratio control signal. Accordingly, a current corresponding to the current command value is supplied to the electromagnetic coil 7a.

That is, the CPU 22 controls the amount of current supplied to the electromagnetic coil 7a, thereby controls the power distribution to the front wheels and the rear wheels. Specifically, the power distribution control apparatus 21 (the CPU 22) controls the frictional engaging force of the clutch discs in the electromagnetic clutch mechanism, thereby selecting one of the first drive mode and the second drive mode. The power distribution control apparatus 21 controls the power distribution ratio (torque distribution ratio) between the front wheels 5a, 5b and the rear wheels 11a, 11b in the four-wheel drive state. The ratio between the torque transmitted to the front wheels 5a, 5b and torque transmitted to the rear wheels 11a, 11b is varied by the control command from the power distribution control apparatus 21 within the range between 100:0 and 50:50.

In the first drive mode, the power distribution control apparatus controls the power transmitting device 7 such that the ratio of the power distribution to the front wheels 5a, 5b is increased. For example, in the first drive mode, the ratio between the torque transmitted to the front wheels 5a, 5b and the torque transmitted to the rear wheels 11a, 11b is varied within the range between 100:0 and 70:30.

In the second drive mode, the power distribution control apparatus 21 controls the power transmitting device 7 such that the power distribution of the engine 2 transmitted to the front wheels 5a, 5b via the power transmitting device 7 is equalized with the power distribution transmitted to the rear wheels 11a, 11b. For example, in the second drive mode, the ratio between the torque transmitted to the front wheels 5a, 5b and the torque transmitted to the rear wheels 11a, 11b is varied within the range between 50:50 and 60:40.

Vehicle Speed Sensor

Based on the wheel speed signals sent from the wheel speed sensors 33a, 33b, 33c, 33d through the input-output circuit 25, the CPU 22 computes the wheel speeds Vfl, Vfr of the left and right front wheels 5a, 5b and the wheel speeds Vrl, Vrr of the left and right rear wheels 11a, 11b. The CPU 22 computes the vehicle speed V based on the computed wheel speeds Vfl, Vfr, Vrl, Vrr.

Differential Rotation Speed

The CPU 22 obtains the average front wheel speed Nfn (Nfn=(Vfl+Vfr)/2) based on the wheel speeds Vfl, Vfr of the left and right front wheels 5a, 5b. The CPU 22 also obtains the average rear wheel speed Nrn (Nrn=(Vrl+Vrr)/2) based on the wheel speeds Vrl, Vrr of the left and right rear wheels 11a, 11b. Further, the CPU 22 computes the differential rotation speed ΔN (ΔN=|Nfn−Nrn|) based on the average front wheel speed Nfn and the average rear wheel speed Nrn.

Steering Wheel Angle and Steering Wheel Angular Velocity

The CPU 22 computes the current steering wheel angle θ and the steering wheel angular velocity Vθ based on the detection signal of the steering wheel angle sensor 34. The steering wheel angular velocity Vθ is the changing amount of the steering wheel angle θ per unit time.

The CPU 22 computes the throttle opening degree θh and the throttle increasing speed Vθh based on the detection signal of the throttle opening degree sensor 32. The throttle increasing speed Vθh is the changing amount of the throttle opening degree θh per unit time.

The CPU 22 computes a duty ratio control signal to the drive circuit 35 so that the drive circuit 35 supplies a current value computed by the CPU 22 to the electromagnetic coil 7a. The drive circuit 35 operates based on the duty ratio control signal and supplies the current value computed by the CPU 22 to the electromagnetic coil 7a. That is, the CPU 22 refers to the two torque characteristics maps for the first drive mode and the second drive mode and computes the duty ratio of the command current value to be supplied to the electromagnetic coil 7a, which is computed according to the throttle opening degree Th, the differential rotation speed ΔN, the vehicle speed V, the steering wheel angle θ, and the steering wheel angular velocity Vθ. The CPU 22 outputs a control signal corresponding to the computed duty ratio to the drive circuit 35 through the input-output circuit 25.

In this embodiment, the engine 2 functions as a power source. The CPU 22, which is a controller, functions as a determining means. The ROM 23 functions as storing means. The throttle opening degree sensor 32 functions as an acceleration manipulation amount detecting device. The steering wheel angle sensor 34 functions as a steering wheel angle detecting device. A delay timer tm functions as a time measuring device. The first threshold value map M1 functions as a steering wheel angular velocity threshold value map. The second threshold value map M2 functions as an acceleration manipulation speed threshold value map. The first object value T1 is the actual steering wheel angular velocity. The second object value T2 is the actual acceleration manipulation speed. The first threshold value T1s functions as a steering wheel angular velocity threshold value. The second threshold value T2s functions as an acceleration manipulation speed threshold value map. Further, the throttle opening degree θh functions as an acceleration manipulation amount. The throttle increasing speed Vθh functions as an acceleration manipulation speed.

Drive Mode Transition Process

Next, a drive mode transmission process of the power distribution control apparatus 21 (the CPU 22) while the four-wheel drive vehicle 1 is driving will be described with reference to the flowchart of FIG. 5. The flowchart is executed based on the various control programs stored in the ROM 23.

The CPU 22 reads detection signals from the wheel speed sensors 33a–33d, the throttle opening degree sensor 32, and the steering wheel angle sensor 34. In S101, the CPU 22 computes the current vehicle speed V, the steering wheel angle θ, the steering wheel angular velocity Vθ, the throttle opening degree θh, and the throttle increasing speed Vθh. The CPU 22 then proceeds to S102. The computed vehicle speed V, the steering wheel angle θ, the steering wheel angular velocity Vθ, the throttle opening degree θh, and a throttle increasing speed Vθh are temporarily stored in the RAM 24. The steering wheel angular velocity V is used as the first object value T1, and the throttle opening degree changing amount Vh is used as the second object value T2. These values are used for determining the degree of sporty driving behavior on the part of the driver.

In S102, the CPU 22 refers to the first threshold value map M1 shown in FIG. 3 to select the first threshold value T1s that corresponds to the current driving state (the vehicle speed V and the steering wheel angle θ). The CPU 22 also refers to the second threshold value map M2 shown in FIG. 4 to select the second threshold value T2s that corresponds to the current driving state (the vehicle speed V and the throttle opening degree θh). The computed first threshold value T1s and the second threshold value T2s are temporarily stored in the RAM 24.

Then, the CPU 22 judges whether the first object value T1 (the current steering wheel angular velocity Vθ) is greater than the first threshold value T1s (S103).

If the outcome of S103 is positive (YES), that is, if the first object value T1 is greater than the first threshold value T1s, the CPU 22 determines that the current driving state is a sporty driving state, and switches the drive mode of the four-wheel drive vehicle 1 to the second drive mode (S104). That is, the CPU 22 executes the power distribution control using the torque characteristics map of the second drive mode. As a result, the traction between the road surface and the front wheels 5a, 5b, and the traction between the road surface and the rear wheels 11a, 11b are increased. This suppresses the occurrence of skidding of the front wheels 5a, 5b and the rear wheels 11a, 11b, and the driving stability of the four-wheel drive vehicle 1 is improved.

On the other hand, if the outcome of S103 is negative (NO), that is, if the first object value T1 is not greater than the first threshold value T1s, the CPU 22 proceeds to S105.

In S105, the CPU 22 judges whether the second object value T2 (the current throttle increasing speed Vθh) is greater than the second threshold value T2s.

If the outcome of S105 is positive (YES), that is, if the second object value T2 is greater than the second threshold value T2s, the CPU 22 determines that the current driving state is a sporty driving state, and switches the drive mode to the second drive mode (S104).

On the other hand, if the outcome of S105 is negative (NO), that is, if the second object value T2 is not greater than the second threshold value T2s, the CPU 22 selects the first drive mode (S106) That is, the CPU 22 determines that the current driving state is not a sporty driving state and executes the power distribution control using the torque characteristics map of the first drive mode.

Thereafter, the CPU 22 executes processes of S101 to S106 at a predetermined control cycle.

For example, when the four-wheel vehicle 1 is repeatedly accelerated and decelerated in a sporty driving state on a winding road in a mountainous area, or when the four-wheel drive vehicle 1 repeatedly turns curves and runs in a straight line, the CPU 22 controls the power transmitting device 7 to prioritize the second drive mode. As shown by alternate long and two short dashes lines in FIG. 2, the CPU 22 includes the delay timer tm. The CPU 22 sets a predetermined delay time Lt only when judging that the drive mode needs to be switched from the second drive mode to the first drive mode (positive outcomes in S103 or S105).

When the delay time Lt is set, the CPU 22 switches the drive mode after the delay timer tm measures the delay time Lt. That is, the CPU 22 controls the power transmitting device 7 to perform the power distribution according to the second drive mode while the delay timer tm is measuring time from when the value of the delay timer is zero to when the value is the delay time Lt. In other words, while the delay timer tm is measuring time, the second drive mode is prioritized over the first drive mode. Therefore, the CPU 22 is prevented from excessively frequently changing the mode of power distribution. Accordingly, changes in the vehicle behavior due to frequent changes in the power distribution mode (hunting due to switching of the drive mode) are suppressed.

When the delay timer tm is not measuring time, the CPU 22 selects one of the first drive mode and the second drive mode according to the current driving state. Then, the CPU 22 controls the power transmission ratio of the power transmitting device 7 such that the power distribution is controlled according to the selected drive mode. In a state where the first drive mode is currently selected, if it is judged that the second drive mode needs to be selected, the CPU 22 does not set the delay time Lt. Therefore, when it is judged that the second drive mode needs to be selected in the first drive mode, the CPU 22 immediately switches the drive mode from the first drive mode to the second drive mode. That is, when a driving state that is likely to impair the driving stability of the vehicle is detected, the drive mode of the vehicle is switched from the first drive mode to the second drive mode in advance. Therefore, the ratio of the power distribution is properly controlled in accordance with the driving state, and the driving stability of the vehicle is ensured.

The preferred embodiment provides the following advantages.

(1) The power distribution control apparatus 21 has the ROM 23 that stores the first threshold value map M1. The map M1 is a three-dimensional map of the steering wheel angular velocity V$\theta$, in which the vehicle speed V and the steering wheel angle $\theta$ are used as parameters. The power distribution control apparatus 21 (strictly speaking, the CPU 22) computes the first threshold value T1s based on the first threshold value map M1 stored in the ROM 23, and compares the first threshold value T1s with the current steering wheel angular velocity V$\theta$. Then, if the current steering wheel angular velocity V$\theta$ is less than the first threshold value T1s, the power distribution control apparatus 21 determines that the first drive mode needs to be selected. If the current steering wheel angular velocity V$\theta$ is greater than the first threshold value T1s, the power distribution control apparatus 21 determines that the second drive mode needs to be selected. The characteristics of the first threshold value map M1 are set such that the first threshold value T1s is decreased as the vehicle speed V is increased. Further, the characteristics of the first threshold value map M1 are determined such that the first threshold value T1s in the predetermined small steering wheel angle region A is greater than the first threshold value T1s in the predetermined great steering wheel angle region B in which the steering wheel angle $\theta$ is greater than in the small steering wheel angle $\theta$ region A.

Accordingly, the CPU 22 accurately detects a driving state in which the vehicle stability is likely to be impaired due to great values of the vehicle speed V and steering wheel angular velocity V$\theta$ (the speed of turning the steering wheel), for example, when the vehicle is on through a winding road, when the vehicle makes a fast swerve, and when the vehicle changes the lanes. In these cases, the CPU 22 selects the second drive mode. Therefore, the power distribution to the front wheels 5a, 5b and the rear wheels 11a, 11b is properly controlled according to each driving state of the vehicle, which improves the driving stability of the vehicle. Further, in the first threshold value map M1, the first threshold value T1s in the predetermined small steering wheel angle region A is greater than the first threshold value T1s in the predetermined great steering wheel angle region B. Therefore, when the vehicle is traveling in a straight line or when the vehicle is traveling almost in a straight line, which states occur frequently, the first drive mode, which focuses on the suppression of deterioration of the fuel consumption and the temperature increase of the transfer, is reliably selected. In this manner, in a driving state that is likely to impair the driving stability of the vehicle related to steering, the second drive mode is selected in advance. At the same time, in a driving state that is unlikely to impair the driving state of the vehicle, the first drive mode is selected. Therefore, a balanced power distribution is executed, in which the driving state of the vehicle is stabilized, the fuel economy is not degraded, and the temperature of the transfer is prevented from increasing.

(2) In addition to the first threshold value map M1, the ROM 23 stores the second threshold value map M2, which is a three-dimensional map of the throttle increasing speed V$\theta$h. In the second threshold value map M2, the vehicle speed V and the throttle opening degree $\theta$h are used as parameters. After judging the drive mode based on the first threshold value map M1, the power distribution control apparatus 21 computes the second threshold value T2s based on the second threshold value map M2 stored in the ROM 23. If the current throttle increasing speed V$\theta$h is less than the second threshold value T2s, the power distribution control apparatus 21 determines that the first drive mode needs to be selected. If the current throttle increasing speed V$\theta$h is greater than the second threshold value T2s, the power distribution control apparatus 21 determines that the second drive mode needs to be selected.

That is, in addition to the first threshold value map M1, the driving state of the vehicle is determined based on the second threshold value map M2. Thus, since the first and second threshold value maps M1, M2 are complementary to each other, a driving state that is likely to impair the driving stability of the vehicle is more accurately detected.

For example, under hard acceleration in a slight curve, determination is difficult with the first threshold value map M1. In this case, the determination is possible with the second threshold value map M2. On the contrary, when the vehicle is slowly accelerated while the steering wheel is turned quickly, the determination is difficult with the second threshold value map M2. In this case, the determination is possible with the first threshold value map M1.

Therefore, using the first and second threshold value maps M1, M2 increases the accuracy of the determination of a sporty driving state. That is, a sporty driving state is finely and accurately detected. Further, a sporty driving state is quickly determined compared to a case where, for example, the driving behavior of the driver is obtained through computation (for example, the lateral acceleration, the steering wheel angular velocity, the depression degree of the acceleration pedal, and the speed of change of the acceleration pedal depression degree are each multiplied by a predetermined coefficient, and the degree of a sporty driving state is computed based on the multiplication results). Therefore, the computation is not complicated, which reduces the computation loads on the CPU 22.

(3) The power distribution control apparatus 21 (the CPU 22) sets the delay time Lt only when the apparatus 21 determines that the first drive mode needs to be selected in the second drive mode. In this case, the drive mode is switched after the delay timer tm measures the delay time Lt. The power distribution control apparatus 21 does not set the delay time Lt if the apparatus determines that second drive mode needs to be selected in the first drive mode. In this case, the drive mode is switched immediately.

That is, when it is determined that the first drive mode needs to be selected while the second drive mode is being selected, the drive mode is switched from the second drive mode to the first drive mode after a predetermined delay time elapses. On the other hand, when it is determined that the second drive mode needs to be selected while the first drive mode is being selected, the drive mode is immediately switched from the first drive mode to the second drive mode.

In this manner, since the drive mode is quickly switched from the first drive mode to the second drive mode, the power distribution is quickly changed to correspond to the second drive mode when a driving state that is likely to impair the driving stability of the vehicle is detected. Also, the determination that the first drive mode needs to be selected while the second drive mode is being selected is made less sensitive by setting the delay time Lt, which is set by the power distribution control apparatus 21. Therefore, the hunting due to switching of the drive modes (repetitive switching between the first drive mode and the second drive mode) is suppressed.

In other words, when the four-wheel vehicle 1 is repeatedly accelerated and decelerated, or when the four-wheel drive vehicle 1 turns curves and runs in a straight line repeatedly on, for example, a winding road, the power distribution control apparatus 21 selects the second drive mode rather than the first drive mode. Therefore, excessively frequent switching of the mode of the power distribution by the power distribution control apparatus 21 (the CPU 22) is suppressed. Accordingly, changes in the behavior of the vehicle due to frequent changes in the power distribution mode are suppressed. Also, since changes of the vehicle behavior are suppressed, the riding comfort of the vehicle is improved.

Continuation of the second drive mode for a short period causes no problem since the second drive mode contributes to the driving stability of the vehicle. Therefore, after suppressing the hunting due to switching of the modes, when the driving state is determined to be likely to impair the driving stability of the vehicle, the power distribution is switched to a more equalized state than the current state, which improves the driving stability of the vehicle.

(4) The CPU 22 computes the throttle increasing speed $V\theta h$ based on the throttle opening degree $\theta h$ detected by the throttle opening degree sensor 32. Then, taking the computed throttle increasing speed $V\theta h$ into consideration, the CPU 22 selects one of the first drive mode and the second drive mode. In addition, the CPU 22 computes the steering wheel angular velocity $V\theta$ based on the steering wheel angle $\theta$ detected by the steering wheel angle sensor 34. Then, the CPU 22 selects the drive mode taking the computed steering wheel angular velocity $V\theta$ into consideration. The CPU 22 controls the power transmission ratio of the power transmitting device 7 according to the selected drive mode.

Therefore, the power distribution ratio of the power transmitting device 7 is controlled according to the driving state of the four-wheel drive vehicle 1, that is, for example, the degree of intention for acceleration of the driver based on the throttle increasing speed $V\theta h$ and the turning speed of the steering wheel based on the steering wheel angular velocity $V\theta$. Therefore, switching from the first drive mode to the second drive mode and switching from the second drive mode to the first drive mode are properly performed according to the driving state. Thus, the ratio of the power distribution is properly controlled in accordance with the driving state. For example, when the driver who prefers sporty driving drives the vehicle, a sporty driving state is accurately detected, and the drive mode is switched to the second drive mode. Thus, the driver who prefers sporty driving is satisfied and enjoys driving the vehicle.

(5) The CPU 22 compares the first and second threshold values T1s, T2s with the current first and second object values T1, T2 (the current steering wheel angular velocity $V\theta$ and the throttle increasing speed $V\theta h$), and selects the drive mode based on the comparison results. Therefore, the degree of intention for acceleration of the driver and the turning speed of the steering wheel are accurately detected based on the throttle increasing speed $V\theta h$ and the steering wheel angular velocity $V\theta$. Therefore, the power distribution to the front wheels 5a, 5b and the rear wheels 11a, 11b are more accurately controlled.

(6) The CPU 22 determines whether the driving state of the four-wheel drive vehicle is a sporty driving state based on the first threshold value map M1 and the second threshold value map M2. Therefore, without executing complicated computations, the CPU 22 is capable of determining whether the driving state is a sporty driving state. Since the CPU 22 determines whether the driving state is a sporty driving state only by referring to the first and second threshold value maps M1, M2, the CPU 22 instantly determines whether the driving state is a sporty driving state. Accordingly, the drive mode is quickly switched between the first drive mode and the second drive mode.

For example, if various parameters such as the lateral acceleration, the steering wheel angular velocity, the throttle opening degree, and the throttle opening degree changing amount are each multiplied by a predetermined coefficient, and whether the driving state is a sporty driving state is determined based on the computation results, the computation amount of the CPU 22 is increased. Accordingly, the load on the CPU 22 is increased. This delays the determination of a sporty driving state. In the illustrated embodiment, data of the threshold values, which are reference values for determining a sporty driving state, are obtained through experiments and are stored in the ROM 23 in advance. Therefore, the determination of a sporty driving state is promptly performed.

It should be apparent to those skilled in the art that the present invention may be embodied in many other specific forms without departing from the spirit or scope of the invention. Particularly, it should be understood that the invention may be embodied in the following forms.

The power distribution control apparatus may be applied to a four-wheel drive vehicle based on a front engine/rear wheel drive (FR) vehicle. This modification has the advantages (1)–(6) of the illustrated embodiment.

The present invention may be applied to a center differential that is a limited slip differential (LSD). That is, an electromagnetic multi-disc clutch may be provided in the center differential mounted to the four-wheel drive vehicle 1. In this case, the power distribution control apparatus 21 changes the power distribution to an arbitrary value between a predetermined ratio determined by the center differential and the ratio of 50:50 of the front and rear wheels. At the ratio of 50:50, the multi-disc clutch is completely engaged.

The power transmitting device 7 may have a hydraulic multi-disc clutch and an electric motor.

The power distribution control apparatus 21 may obtain signals of the sensors related, for example, to the throttle opening degree $\theta h$, the wheel speeds Vfl, vfr, Vrl, Vrr, and the steering wheel angle $\theta$ through a multiplex communication system (Controller Area Network: CAN, or an in-vehicle LAN) of the four-wheel drive vehicle 1.

Figure 5:
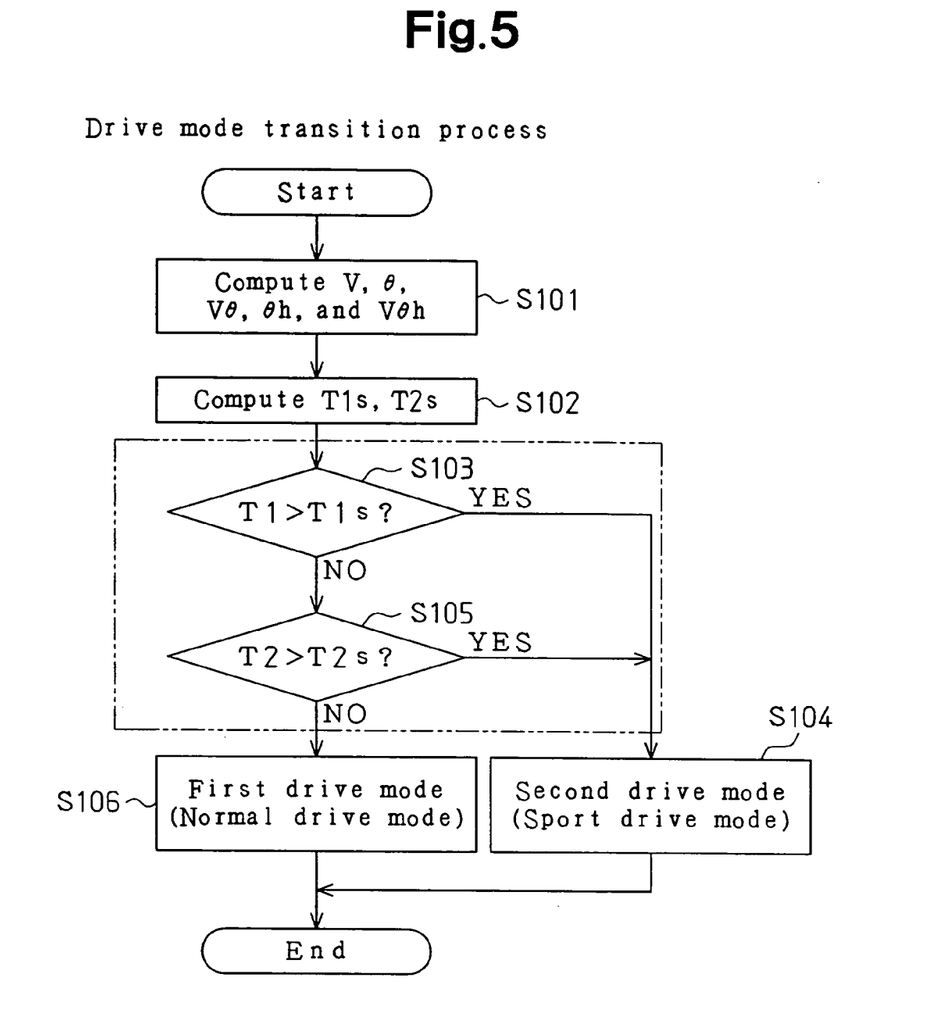
FIG. 5 is a flowchart showing a control for the drive mode while the vehicle is driving.

In the flowchart of FIG. 5, the CPU 22 may execute S103 after executing S105.

As an acceleration manipulation amount, which represents the degree of intention for acceleration of the driver, the acceleration pedal depression degree may be used.

The vehicle speed V may be obtained by calculating the average value of the wheel speed of the rear wheels 11a, 11b, which are the follower wheels and have a small amount of wheel skid.

In the illustrated embodiment, the drive state is selected by taking both of the steering wheel angular velocity $V\theta$ and the throttle increasing speed $V\theta h$ into consideration. However, the drive state may be selected based only on the throttle increasing speed $V\theta h$. That is, S104 in the flowchart of FIG. 5 may be omitted. In this case also, the power transmission ratio is appropriately controlled in S105 according to the degree of the intention for acceleration of the driver based on the steering wheel angular velocity $V\theta$.

The present examples and embodiments are to be considered as illustrative and not restrictive and the invention is not to be limited to the details given herein, but may be modified within the scope and equivalence of the appended claims.

The invention claimed is:

1. A power distribution control apparatus of a four-wheel drive vehicle equipped with a power source, the vehicle having front wheels and rear wheels, and a transmitting device, wherein the front wheels and the rear wheels are driven by the power source, and the transmitting device is capable of changing distribution of power to the front wheels and the rear wheels, wherein the control apparatus selects one of at least a first drive mode and a second drive mode according to a driving state of the vehicle, and the control apparatus controls the transmitting device such that the power distribution to the front wheels and the rear wheels is a ratio that corresponds to the selected drive mode, and wherein an power distribution to the front wheels and the rear wheels is closer to the equalized state in the second drive mode than in the first drive mode, the control apparatus comprising:

storing means that in advance stores a threshold value map used for setting a threshold value related to an angular velocity of a steering wheel of the vehicle, wherein the threshold value map is a three-dimensional map that uses a vehicle speed and an angle of the steering wheel as parameters; and determining means, wherein, based on the threshold value map, a determining means sets the threshold value according to a current vehicle speed and the steering wheel angle, wherein, when the current steering wheel angular velocity is not greater than the set threshold value, the determining means selects the first drive mode, and wherein, when the current steering wheel angular velocity is greater than the set threshold value, the determining means selects the second drive mode, wherein the threshold value map is configured such that the threshold value is decreased as the vehicle speed is increased and that threshold value is greater in a predetermined small steering wheel angle region than in a steering wheel angle region that corresponds to greater values of the steering wheel angle than the small steering wheel angle region.

2. The control apparatus according to claim 1, wherein the threshold value map is a first threshold value map, and the threshold value is a first threshold value, wherein the storing means in advance stores a second threshold value map used for setting a second threshold value related to an acceleration manipulation speed, which is the speed of manipulation required for accelerating the vehicle, and wherein the second threshold value map is a three-dimensional map that uses the vehicle speed and an acceleration manipulation amount as parameters, the acceleration manipulation amount representing the degree of intention for acceleration of a driver, wherein, based on the second threshold value map, the determining means sets the second threshold value according to the current vehicle speed and the acceleration manipulation amount, wherein, when the current acceleration manipulation speed is not greater than the set second threshold value, the determining means selects the first drive mode, and wherein, when the current acceleration manipulation speed is greater than the set second threshold value, the determining means selects the second drive mode.

3. The control apparatus according to claim 2, wherein the power source is an internal combustion engine having a throttle valve, the acceleration manipulation amount is an opening degree of the throttle valve, and the acceleration manipulation speed is an increasing speed of the opening degree of the throttle valve.

4. The control apparatus according to claim 2, wherein, before or after selecting the drive mode based on the first threshold value map, the determining means selects the drive mode based on the second threshold value map, and wherein, when the determining means selects the second drive mode based on at least one of the first and second threshold value maps, the transmitting device is controlled according the second drive mode.

5. The control apparatus according to claim 2, wherein the second threshold value map is configured such that the second threshold value is decreased as the vehicle speed and the acceleration manipulation amount are each increased.

6. The control apparatus according to claim 1, wherein, if the first drive mode is newly selected in a state where the second drive mode is selected, the control of the transmitting device is switched from the control according the second drive mode to the control according to the first drive mode when a predetermined delay time has elapsed after the first drive mode is selected, and wherein, if the second drive mode is newly selected in a state where the first drive mode is selected, the control of the transmitting device is switched from the control according to the first drive mode to the control according to the second drive mode immediately after the second drive mode is selected.

7. A power distribution control apparatus of a four-wheel drive vehicle equipped with a power source, the vehicle having front wheels and rear wheels, and a transmitting device, wherein the front wheels and the rear wheels are driven by the power source, and the transmitting device is capable of changing distribution of power to the front wheels and the rear wheels, the control apparatus comprising:

a memory that in advance stores a threshold value map used for setting a threshold value related to an angular velocity of a steering wheel of the vehicle, wherein the threshold value map is a three-dimensional map that uses a vehicle speed and an angle of the steering wheel as parameters; and a controller for controlling the transmitting device, wherein the controller controls the transmitting device such that the power distribution to the front wheels and the rear wheels is a ratio that corresponds to a drive mode that is selected from a first drive mode and a second drive mode, wherein the power distribution to the front wheels and the rear wheels is closer to an equalized state in the second drive mode than in the first drive mode, wherein, based on the threshold value map, the controller sets the threshold value according to the current vehicle speed and the steering wheel angle, wherein, when a current steering wheel angular velocity is not greater than the set threshold value, the controller selects the first drive mode, and wherein, when the current steering wheel angular velocity is greater than the set threshold value, the controller selects the second drive mode, wherein the threshold value map is configured such that the threshold value is decreased as the vehicle speed is increased and that threshold value is greater in a predetermined small steering wheel angle region than in a steering wheel angle region that corresponds to greater values of the steering wheel angle than the small steering wheel angle region.

8. The control apparatus according to claim 7, wherein the threshold value map is a first threshold value map, and the threshold value is a first threshold value, wherein the memory in advance stores a second threshold value map used for setting a second threshold value related to an acceleration manipulation speed, which is the speed of manipulation required for accelerating the vehicle, and wherein the second threshold value map is a three-dimensional map that uses the vehicle speed and an acceleration manipulation amount as parameters, the acceleration manipulation amount representing the degree of intention for acceleration of a driver, wherein, based on the second threshold value map, the controller sets the second threshold value according to the current vehicle speed and the acceleration manipulation amount, wherein, when the current acceleration manipulation speed is not greater than the set second threshold value, the controller selects the first drive mode, and wherein, when the current acceleration manipulation speed is greater than the set second threshold value, the controller selects the second drive mode.

9. A method for controlling a power distribution control apparatus of a four-wheel drive vehicle equipped with a power source, the vehicle having front wheels and rear wheels, and a transmitting device, wherein the front wheels and the rear wheels are driven by the power source, and the transmitting device is capable of changing distribution of power to the front wheels and the rear wheels, the method comprising:

controlling the transmitting device such that the power distribution to the front wheels and the rear wheels is a ratio that corresponds to a drive mode that is selected from a first drive mode and a second drive mode, wherein the power distribution to the front wheels and the rear wheels is closer to an equalized state in the second drive mode than in the first drive mode;

storing in advance in a memory a threshold value map used for setting a threshold value related to an angular velocity of a steering wheel of the vehicle, wherein the threshold value map is a three-dimensional map that uses a vehicle speed and an angle of the steering wheel as parameters;

setting the threshold value according to the current vehicle speed and the steering wheel angle based on the threshold value map; and selecting the first drive mode when the current steering wheel angular velocity is not greater than the set threshold value, and selecting the second drive mode when the current steering wheel angular velocity is greater than the set threshold value, wherein the threshold value map is configured such that the threshold value is decreased as the vehicle speed is increased and that threshold value is greater in a predetermined small steering wheel angle region than in a steering wheel angle region that corresponds to greater values of the steering wheel angle than the small steering wheel angle region.

10. The method according to claim 9, wherein the threshold value map is a first threshold value map, and the threshold value is a first threshold value, the method further comprising:

storing in advance in the memory a second threshold value map used for setting a second threshold value related to an acceleration manipulation speed, which is the speed of manipulation required for accelerating the vehicle, and wherein the second threshold value map is a three-dimensional map that uses the vehicle speed and an acceleration manipulation amount as parameters, the acceleration manipulation amount representing the degree of intention for acceleration of a driver;

setting the second threshold value based on the second threshold value map according to the current vehicle speed and the acceleration manipulation amount; and selecting the first drive mode when the current acceleration manipulation speed is not greater than the set second threshold value, and selecting the second drive mode when the current acceleration manipulation speed is greater than the set second threshold value.

11. The method according to claim 10, wherein the selection of the drive mode based on the second threshold value map is performed before or after the selection of the drive mode based on the first threshold value map, and wherein, when the second drive mode is selected based on at least one of the first and second threshold value maps, the transmitting device is controlled according the second drive mode.

12. The method according to claim 10, wherein the second threshold value map is configured such that the second threshold value is decreased as the vehicle speed and the acceleration manipulation amount are each increased.

13. The method according to claim 9, further comprising:

if the first drive mode is newly selected in a state where the second drive mode is selected, switching the control of the transmitting device from the control according to the second drive mode to the control according to the first drive mode when a predetermined delay time has elapsed after the first drive mode is selected, and if the second drive mode is newly selected in a state where the first drive mode is selected, switching the control of the transmitting device from the control according to the first drive mode to the control according to the second drive mode immediately after the second drive mode is selected.

* * * * *